United States Patent
Shin (10) Patent No.: US 6,510,485 B1
(45) Date of Patent: Jan. 21, 2003

(54) STABILIZING CIRCUIT FOR INTERFACING DEVICE

(75) Inventor: Seung-Gi Shin, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/333,263

(22) Filed: Jun. 15, 1999

(30) Foreign Application Priority Data

Jun. 15, 1998 (KR) ............................. 98-22268

(51) Int. Cl.[7] ............................. G06F 13/14; G06F 1/24
(52) U.S. Cl. ..................... 710/315; 710/305; 713/300
(58) Field of Search ................. 710/305–315; 713/300–340; 326/21–34

(56) References Cited

U.S. PATENT DOCUMENTS

| | | | |
|---|---|---|---|
| 4,667,289 A | * 5/1987 | Yoshida et al. | 713/340 |
| 4,956,766 A | 9/1990 | Dhopeshwarkar et al. | |
| 5,497,284 A | 3/1996 | Le Van Suu | |
| 5,675,747 A | * 10/1997 | Sawanobori | 710/100 |
| 5,712,754 A | * 1/1998 | Sides | 361/18 |
| 5,748,426 A | 5/1998 | Bedingfield et al. | |
| 5,815,647 A | 9/1998 | Buckland et al. | |
| 5,848,135 A | * 12/1998 | Elghanayan et al. | 379/100.01 |
| 5,886,431 A | 3/1999 | Rutigliano | |
| 5,903,426 A | * 5/1999 | Ehling | 361/119 |
| 6,198,384 B1 | * 3/2001 | Oi et al. | 340/333 |
| 6,316,964 B1 | * 11/2001 | Watarai | 326/115 |

* cited by examiner

Primary Examiner—Sumati Lefkowitz
(74) Attorney, Agent, or Firm—Robert E. Bushnell, Esq.

(57) ABSTRACT

An interfacing device is disclosed which is comprised of a read-only memory (ROM) device, a power regulator, a plurality of specific ports, a link layer controller, a physical layer arbiter, a switching unit which switches the state of the power provided to the peripheral equipment through specific ports, a resetting unit which resets the link layer controller, an indicating unit which displays the state of the power provided to the physical layer arbiter and the operation state of the physical layer arbiter. The present invention prevents the interfacing device and other peripheral equipment from being damaged due to the reverse current generated from specific peripheral equipment, and provides for a reset of the interfacing device, and thus restarting the computer system is not needed in order to reset the interfacing device.

23 Claims, 5 Drawing Sheets

FIG.6

STABILIZING CIRCUIT FOR INTERFACING DEVICE

CLAIM OF PRIORITY

This application makes reference to, incorporates the same herein, and claims all benefits accruing under 35 U.S.C. §119 from an application entitled Stabilizing Circuit for Interfacing Device earlier filed in the Korean Industrial Property Office on Jun. 15, 1998, and there duly assigned Ser. No. 98-22268, a copy of which is annexed hereto.

BACKGROUND OF THE INVENTION

1. Technical Field

The present invention relates to a circuit for stabilizing interfacing devices, and more particularly to a stabilization circuit for preventing a bus interfacing device from being damaged due to a reverse current provided from peripheral equipment.

2. Related Art

An interfacing device can be used to couple a computer system with peripheral equipment. Background information regarding computer systems is as follows. Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, and a hard disk storage device. A computer system's main board, which is a printed circuit board known as a motherboard, can be used to electrically connect these components together. A computer system can be a desktop computer, a personal computer, a portable computer such as a notebook computer or palm-sized computer, or other type of computer.

A computer system can be coupled to peripheral equipment such as a printer, a scanner, a camera, and other units. An interfacing device can be used to couple a printer and scanner to a central processing unit of a computer system.

For example, an interfacing device can receive data from a central processing unit, convert the data from a Peripheral Component Interconnect (PCI) format to an Institute of Electrical and Electronic Engineers (IEEE) 1394 format, and then transmit the converted data to peripheral equipment. Or an interfacing device can receive data from peripheral equipment, convert the data from an IEEE 1394 format to a PCI format, and then transmit the converted data to the central processing unit.

I have found that a damaged interfacing device, a damaged computer system, and damaged peripheral equipment can be extremely inconvenient. Efforts have been made to improve interfacing devices.

Exemplars of recent efforts in the art include U.S. Pat. No. 5,886,431 for Circuit And Method of Operation to Control In-Rush Current From a Power Supply to Peripheral Devices in an Information System issued to Rutigliano, U.S. Pat. No. 5,815,647 for Error Recovery by Isolation of Peripheral Components in a Data Processing System issued to Buckland et al., U.S. Pat. No. 5,748,426 for Method for Interfacing to a Powered Bus issued to Bedingfield et al., U.S. Pat. No. 5,497,284 for Method and Device for the Protection of a Series Bus Against Short Circuits issued to Le Van Suu, and U.S. Pat. No. 4,956,766 for Systems for Inhibiting Errors Caused by Memory Cartridge Insertion/Removal Using an Idle Loop issued to Dhopeshwarkar et al.

While these recent efforts provide advantages, I note that they fail to adequately provide a stabilizing circuit for interfacing device.

SUMMARY OF THE INVENTION

It is an object of the present invention to provide a stabilization circuit for resetting a halted bus interfacing device in no relation to the operation of the computer system, and preventing the bus interfacing device from being damaged due to a reverse current provided from the peripheral equipment.

In one aspect of the present invention, the interfacing circuit is comprised of: a port unit including at least one or more ports and being coupled to peripheral equipment which provides the power and data; an interfacing unit interfacing the system and the peripheral equipment; and a switching unit switching the power which is provided to the peripheral equipment through the port unit in order to reset the peripheral equipment. The interfacing unit is comprised of a link layer controller and physical layer arbiter, and further comprised of a resetting unit resetting the link layer controller, and an indicating unit indicating the state of the power which is provided from a power regulator to the physical layer arbiter and the operation state of the physical layer arbiter.

To achieve these and other objects in accordance with the principles of the present invention, as embodied and broadly described, the present invention provides an electronic apparatus, comprising: at least one external device performing first data processing functions; a port unit being coupled to said at least one external device, conveying power to said at least one external device; a control unit performing second data processing functions; an interface unit being coupled to said control unit, said interface unit conveying the power to said port unit from said control unit; a reset unit being coupled to said interface unit and said control unit, said reset unit selectively resetting said interface unit; and a switch unit being coupled to said port unit and said interface unit, said switch unit switching on to convey power between said interface unit and said port unit, said switch unit switching off to not convey power between said interface unit and said port unit.

To achieve these and other objects in accordance with the principles of the present invention, as embodied and broadly described, the present invention provides an electronic apparatus, comprising: a port unit having a switch and having a plurality of ports including a first port, said first port being coupled to at least one external device performing first data processing functions, said port unit conveying power to said at least one external device, said port unit switching on to convey power between said interface unit and said at least one external device, said port unit switching off to not convey power between said interface unit and said at least one external device; a control unit performing second data processing functions; an interface unit conveying the power to said port unit from said control unit; a reset unit being coupled to said interface unit and said control unit, said reset unit resetting said interface unit in response to a control signal received from said control unit; said interface unit further comprising: a physical link unit including a reset terminal receiving from said reset unit a reset signal resetting said physical link unit, said physical link unit converting data formats and arbitrating among information received from said port unit; a power regulator providing power to said physical link unit; and an indicating unit indicating a state of the power provided from said power regulator to said physical link unit and indicating an operation state of said physical link unit.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
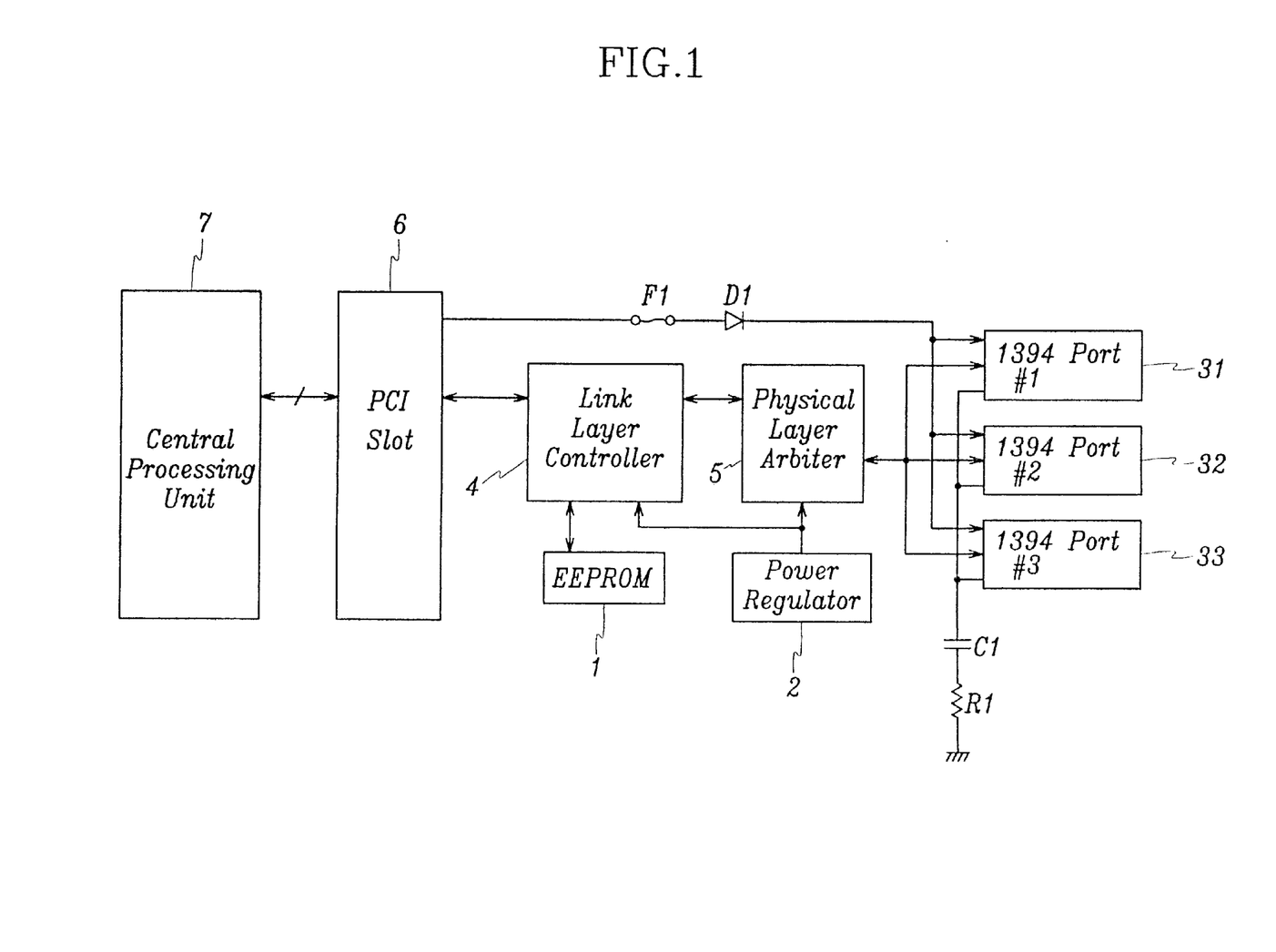
FIG. 1 is a schematic diagram of an interfacing device.

Turn now to FIG. 1, which shows a schematic diagram of an interfacing device. Referring to FIG. 1, the interfacing device is comprised of a read-only memory device (ROM) 1, a power regulator 2, a port unit 3, a link layer controller 4, and a physical layer arbiter 5. The ROM 1 is an electrically-erasable-programmable-read-only-memory (EEPROM) chip which stores the serial number and parameters of the interfacing device. The power regulator 2 provides the link layer controller 4 and physical layer arbiter 5 with power.

The CPU 7 shown in FIG. 1 could be contained within a computer system or within a different type of system such as an automobile, a robot, a home security system, a home appliance automation system, or other system.

Figure 2:
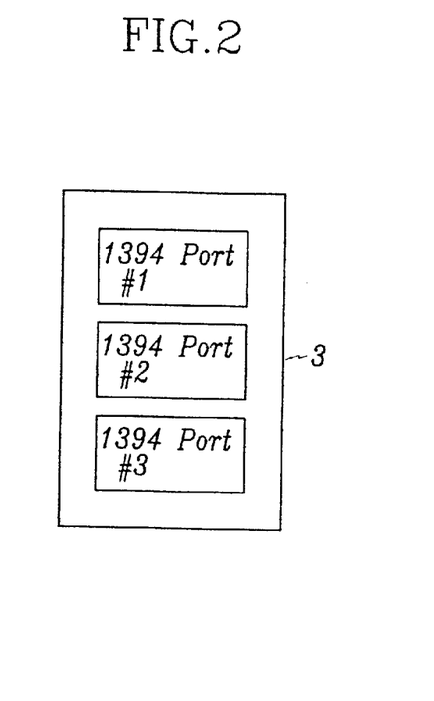
FIG. 2 is a schematic diagram of a bracket.

Turn now to FIG. 2, which shows a schematic diagram of a bracket. Referring to FIG. 2, the port unit 3 is comprised of a plurality of ports and is attached to a bracket of the interfacing device so as to be accessible from the outside, and hence the peripheral equipment which transmits and receives the IEEE 1394 bus type data is installed on the bracket. The link layer controller 4 converts the PCI bus type data provided from the CPU through the PCI slots 6 into the IEEE 1394 bus type data and outputs the converted data to the physical layer arbiter 5, and converts the IEEE 1394 bus type data provided from the peripheral equipment installed to the plurality of IEEE 1394 ports 31, 32, 33 through the physical layer arbiter 5 into the PCI bus type data and transmits the converted data to the CPU 7. When each data element is provided from the peripheral equipment installed to a plurality of 1394 ports 31, 32, or 33 to the physical layer arbiter 5, the physical layer arbiter 5 selects one input data element and holds other data element on standby. When the IEEE 1394 bus type data are provided from the peripheral equipment installed to the selected port 31, 32, or 33, the physical layer arbiter outputs the provided data to the link layer controller 4, and when the IEEE 1394 bus type data is provided from the link layer controller 4, the physical layer arbiter outputs the provided data to the peripheral equipment coupled to the corresponding port 31, 32, or 33.

Peripheral Component Interconnect (PCI) is a bus for computers designed by Intel Corporation, which supports Plug-and-Play. It provides a high-speed connection with peripherals and allows connection of multiple peripheral devices. It is processor independent and therefore able to work with multiple types of processors. It plugs into a PCI slot on the motherboard and can be used along with an Industry Standard Architecture (ISA) or Extended Industry Standard Architecture (EISA) bus.

Figure 3:
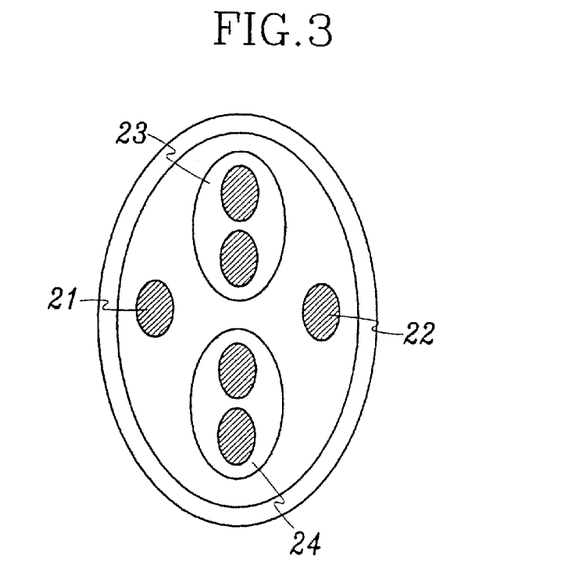
FIG. 3 is a cross sectional view of an IEEE 1394 cable.

Turn now to FIG. 3, which shows a cross sectional view of an IEEE 1394 cable. Each peripheral equipment is installed to each 1394 port 31, 32, or 33 through an IEEE 1394 cable, and referring to FIG. 3, IEEE 1394 cable is comprised of two power lines 21 and 22 which provide voltage ranging from 8–40 V, and two pairs of signal lines 23 and 24 which transmit data signals.

The IEEE 1394 (1995) is an IEEE designation for a high performance serial bus. This serial bus defines both a backplane physical layer and a point-to-point cable-connected virtual bus. The backplane bus version operates at 12.5, 25, or 50 megabits per second (Mbits/sec), whereas the cable point-to-point version supports data rates of 100, 200, and 400 Mbits/sec across the cable medium supported in the current standard. Both versions are totally compatible at the link layer and above. The interface standard defines transmission method, media, and protocol.

The primary application of the cable version is the integration of input/output (I/O) connectivity at the back panel of personal computers using a low-cost, scalable, high-speed serial interface. The IEEE 1394 standard also provides new services such as realtime I/O and live connect/disconnect capability for external devices including disk drives, printers, and hand-held peripherals such as scanners and cameras. The IEEE 1394 (1995) serial bus has the bandwidth capacity to displace most other peripheral connection communication methods in use today, including Centronix parallel, RS-232, and small computer systems interface (SCSI), and consolidate them into a unified high-performance serial bus.

Figure 4:
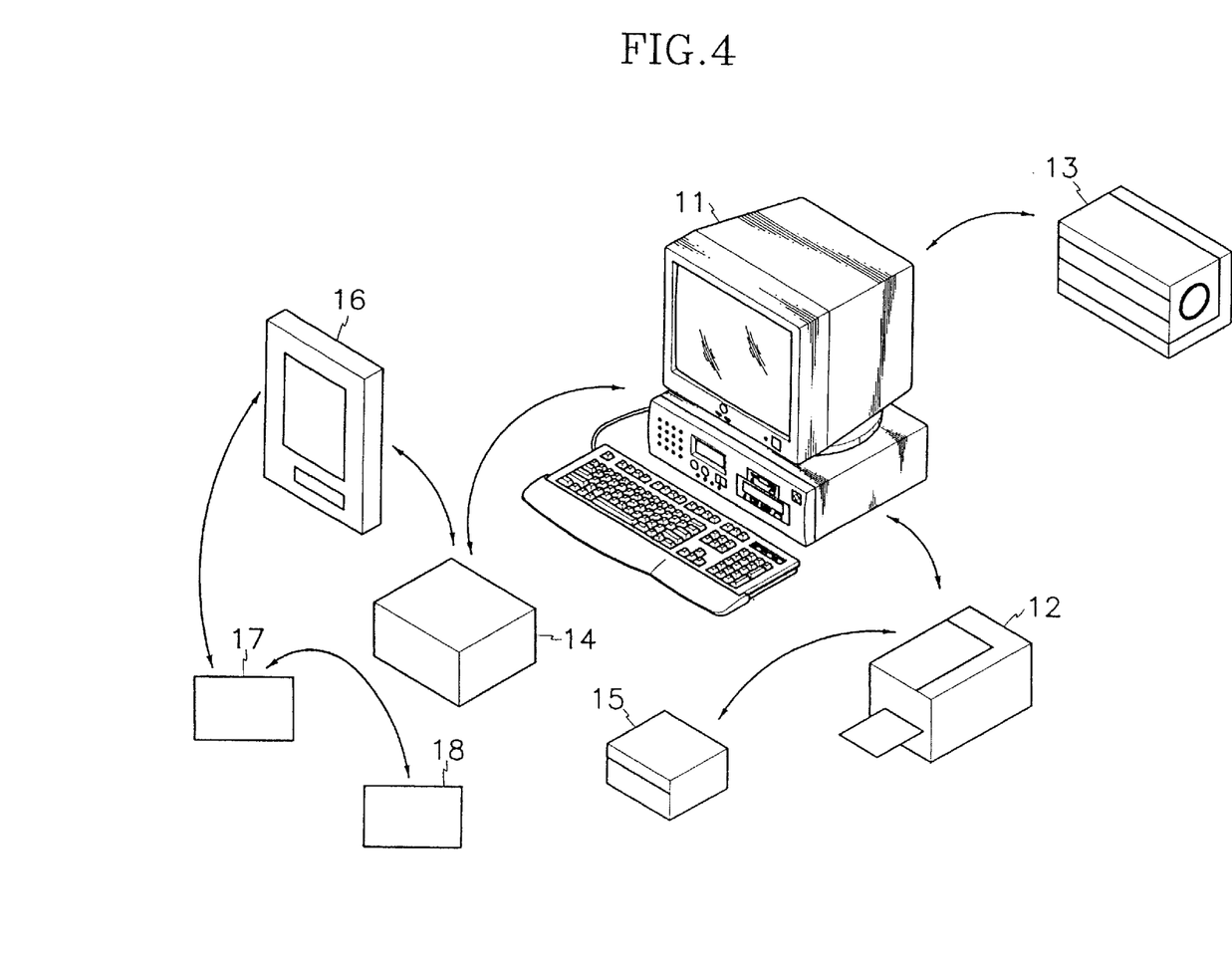
FIG. 4 is a diagram of the computer system connected to peripheral equipment through the interfacing device.

Turn now to FIG. 4, which shows a diagram of the computer system connected to peripheral equipment through the interfacing device. FIG. 4 shows a diagram for connections between a computer system 11 equipped with an interfacing device and the peripheral equipment. A printer 12, camera 13, and a setup box 14 is connected to each 1394 port of the interfacing device of the computer system, and a scanner 15 is connected to the printer 12, and an indicating device 16 is connected to the setup box 14, and a recorder 17 is connected to the indicating device 16, and a camcorder 18 is connected to the recorder 17.

Figure 5:
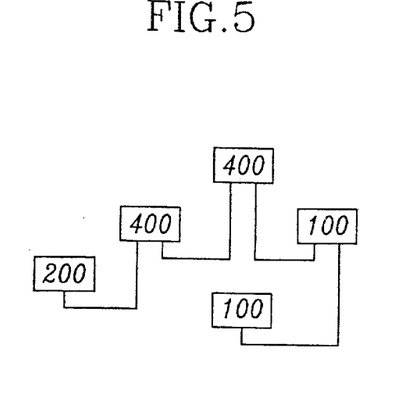
FIG. 5 is a diagram of the interfacing devices each having different transmission speeds.

Turn now to FIG. 5, which shows a diagram of the interfacing devices each having different transmission speeds. FIG. 5 shows a diagram for connections between the systems installed with interfacing device which respectively have different transmission speeds. That is, a system with a 1394 card which covers the speeds of up to 400 megabits per second (Mbps) is connected to other systems with 1394 cards which provide different line speeds of 100, 200, and 400 Mbps. The systems are connected in series and therefore, data are transferred using packets between them. However, because each 1394 card provides different line speeds, the systems using a plurality of 1394 cards which cover various speeds sometimes have difficulty in transmitting or receiving the correct data. Additionally, because the 1394 bus function also manages the resources of the system, the system may fail to operate properly even though the main board of the computer system is working.

A stabilization circuit for an interfacing device will now be discussed. Referring to FIG. 1, a fuse F1 and diode D1 are serially connected to the PCI slots 6 and each one end of the 1394 port 31, 32, and 33, so that the reverse current inputted from the peripheral equipment through the IEEE 1394 cables and ports is prevented from running into the computer system. Additionally, serially connected capacitor C1 and resistor R1 which form a protection circuit are serially connected to each of the other ends of the 1394 port 31, 32, and 33, so that the noise is removed which is generated when the interfacing device transmits and receives data to/from the peripheral equipment.

When a specific item of peripheral equipment becomes the source of reverse current, the fuse F1 and the diode D1 protect the computer system. However, the fuse and diode do not protect the interfacing device or other peripheral equipment, and thereby the interfacing equipment or other peripheral equipment may be damaged. Furthermore, even though the computer system itself is working very well, when the interfacing device is halted due to communication trouble, the computer system must be restarted in order to reset the interfacing device. In other words, the computer system must be rebooted in order to reset the interfacing device.

Preferred embodiments of the present invention will now be described in detail with reference to the accompanying drawings.

Figure 6:
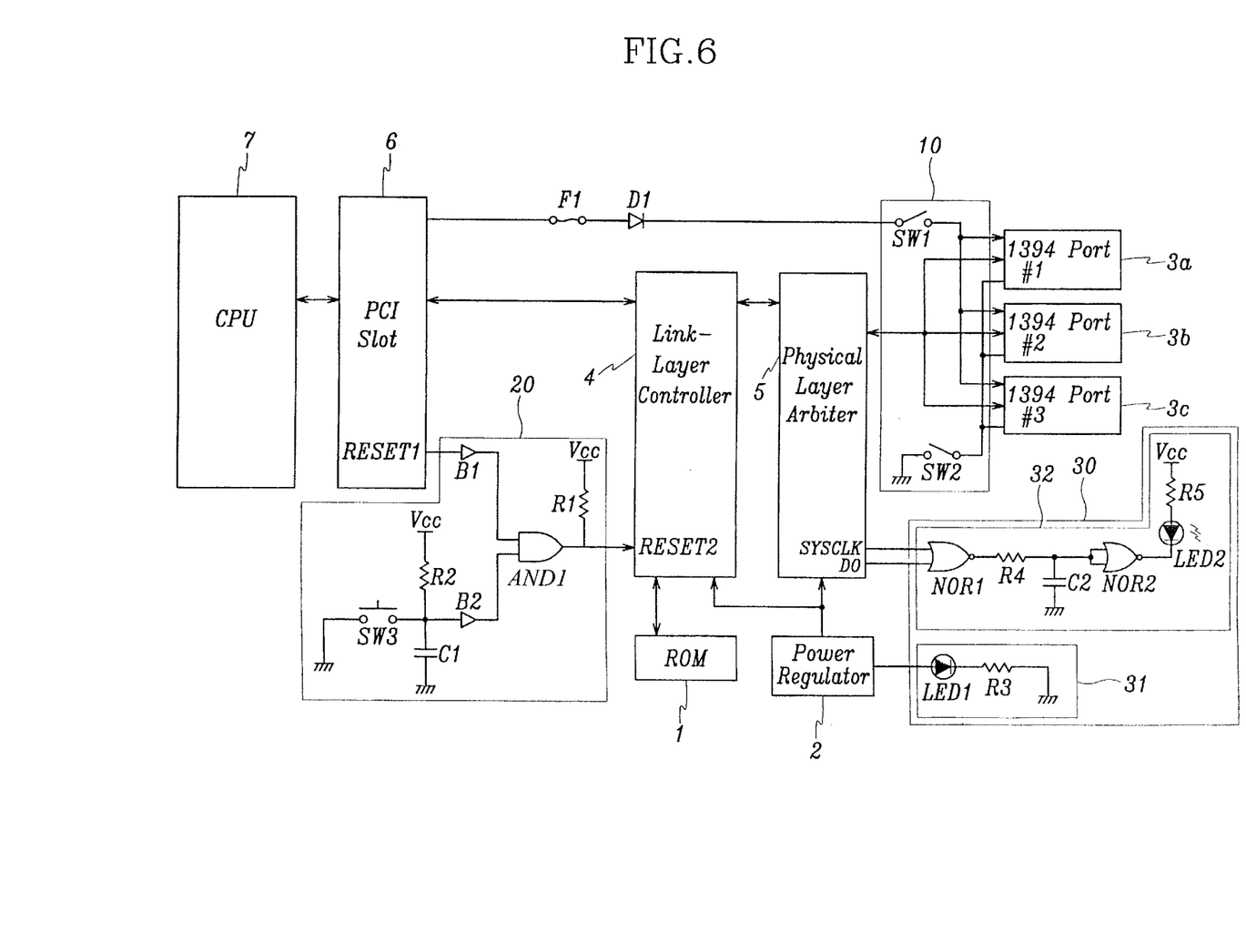
FIG. 6 illustrates a detailed schematic diagram for an interfacing device, in accordance with the principles of the present invention.

Turn now to FIG. 6, which shows a detailed schematic diagram for an interfacing device, in accordance with the principles of the present invention. An interfacing device according to a preferred embodiment of the present invention is comprised of: a ROM 1; a power regulator 2; a plurality of 1394 ports 3a, 3b, and 3c; a link layer controller 4; a physical layer arbiter 5; a switching unit 10 which switches the states of the power provided to the peripheral equipment through the respective IEEE 1394 ports 3a, 3b, and 3c; a resetting unit 20 which resets the link layer controller 4; and an indicating unit 30 which displays the state of the power which is provided from a power regulator 2 to the physical layer arbiter 5 and the operation state of the physical layer arbiter 5.

The IEEE 1394 port #1 depicted in FIG. 6 is intended to correspond to a port 3a or a slot 3a. In other words, the IEEE 1394 port #1 depicted in FIG. 6 either can correspond to a port 3a receiving a cable coupled to an external device or can correspond to a slot 3a receiving a card. Thus, the port 3a of the IEEE 1394 port #1 of FIG. 6 is intended to portray a port 3a able to receive a cable conforming to the IEEE 1394 cable standard, where the cable is coupled to an external device such as a printer or a camera. In addition, the port 3a of the IEEE 1394 port #1 of FIG. 6 is intended to portray a slot 3a able to receive a card conforming to the IEEE 1394 backplane bus standard, where the card provides additional function to the CPU 7. Typical functions that a user might add to a computer include sound features of a sound card, graphics features of a graphics card, additional memory of a memory card, fax/modem capability of a modem card, and other types of cards.

The switching unit 10 is comprised of: a first DIP switch SW1 wherein the one pin of the first DIP switch is coupled to the IEEE 1394 ports 3a, 3b, and 3c, and the other pin of the first DIP switch is coupled to the power port of the PCI slots 6; and a second DIP switch SW2 wherein the one pin of the second DIP switch is coupled to the IEEE 1394 ports 3a, 3b, and 3c, and the other pin of the second DIP switch is grounded.

The resetting unit 20 is comprised of: a logical AND gate AND1 wherein the output pin of the logical AND gate is coupled to the reset pin RESET2 of the link layer controller 4 and coupled to the pull-up resistor R1; a first buffer B1 wherein an output pin of the first buffer is coupled to an input pin of the logical AND gate AND1 and an input pin of the first buffer is coupled to a reset pin RESET1 of the PCI slots 6; a second buffer B2 wherein an output pin of the second buffer is coupled to another input pin of the logical AND gate AND1; a first resistor R2 wherein one end of the resistor is coupled to an input pin of the second buffer B2 and the other end of the resistor is coupled to the voltage Vcc; a capacitor C1 wherein one end of the capacitor is coupled to one end of the first resistor R2 and the other end of the capacitor is grounded; and a push button switch SW3 wherein one end of the push button switch is coupled to a point where the resistor R2 and capacitor C1 meet and the other end of the push button switch is grounded.

The indicating unit 30 is comprised of: a first indicating unit 31 indicating the state of the power provided from the power regulator 2 to the physical layer arbiter 5; and a second indicating unit 32 indicating the operation state of the physical layer arbiter 5.

The first indicating unit 31 is comprised of: a first lighting element LED1 wherein an anode pin of the first lighting element is coupled to the power regulator 2 and a cathode pin of the first lighting element is grounded through a resistor R3.

The second indicating unit 32 is comprised of: a first logical NOR gate NOR1 wherein one input pin of the first logical NOR gate is coupled to a clock pin SYSCLK of the physical layer arbiter 5 and the other input pin of the first logical NOR gate is coupled to a data pin of the physical layer arbiter 5; a resistor R4 wherein one end of the resistor is coupled to a output pin of the first logical NOR gate NOR1; a capacitor C2 wherein one end of the capacitor is coupled to other end of the resistor R4 and the other end is grounded; a second logical NOR gate NOR2 wherein both of the input pins of the second logical NOR gate are coupled to the point where the other end of the resistor R4 and one end of the capacitor C2 meet; and a second lighting element LED2 wherein a cathode pin of the second lighting element is coupled to an output pin of the second logical NOR gate NOR2 and an anode pin of the second lighting element is coupled to the voltage Vcc port through a resistor R5.

Figure 7:
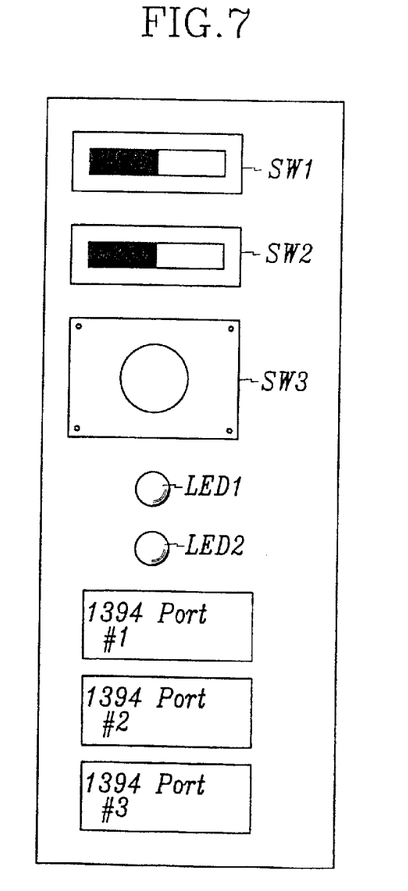
FIG. 7 illustrates a schematic diagram of the bracket in the interfacing device, in accordance with the principles of the present invention.

Turn now to FIG. 7, which shows a schematic diagram of the bracket in the interfacing device, in accordance with the principles of the present invention. Referring to FIG. 7, the first DIP switch SW1, the second DIP switch SW2, the push button switch SW3, the first lighting element LED1, and the second lighting element LED2 are installed to the bracket of the interfacing device so as to be accessible from the external device.

The operation according to the preferred embodiment of the present invention will now be explained. When the interface device is installed to the PCI slots 6 of the computer system and the peripheral equipment is installed to each 1394 port 3a, 3b, and 3c of the interfacing device, and the power is supplied to the link layer controller 4 and physical layer arbiter 5 from the power regulator 2, then, the first lighting element LED1 of the first indicating unit 31 is turned on showing that the interfacing device is available.

Then, by using the link layer controller 4 and physical layer arbiter 5, the interfacing device converts the PCI bus type data provided from the CPU 7 of the computer system into IEEE 1394 bus type data, and outputs the converted data to the peripheral equipment installed to a specific port (3a, 3b, or 3c), and, converts the data which is inputted from the peripheral equipment installed to a specific 1394 port (3a, 3b, 3c) as IEEE 1394 bus type data into PCI bus type data and outputs the converted data to the CPU 7.

When the interfacing device receives data from the CPU 7 or peripheral equipment, or converts the received data into a specific bus type data and transmits the converted data to the CPU 7 or corresponding peripheral equipment, then the pulse signal outputted from the clock pin SYSCLK of the physical layer arbiter 5 and the pulse signal outputted from the first data pin D0 are provided to the first and second input pins of the first logical NOR gate NOR1.

Only when the pulse signals provided to the first and second input pins of the first logical NOR gate NOR1 are all in low state, a high pulse signal is outputted. The outputted pulse signal is passed through the resistor R4 and capacitor C2 and is provided to the first and second input pins of the second logical NOR gate NOR2. The second logical NOR gate NOR2 then inverts the inputted signal and outputs the inverted signal. Then, when the signal outputted from the NOR2 is in a low state, the second lighting element LED2 is switched on, and when the signal outputted from the NOR2 is in high state, the second lighting element LED2 is switched off. However, because the signal outputted from the NOR2 switches very fast, a user may perceive that the LED2 is switched on.

In the event that a reverse current generated in a specific peripheral equipment is supplied to the interfacing device through the corresponding IEEE 1394 port (3a, 3b, or 3c), the user turns off the two DIP switches SW1 and SW2 installed in the bracket. When the user turns off the two switches SW1 and SW2, the power provided to the peripheral equipment through the PCI slots 6 is cut and the peripheral equipment is stopped. Therefore, the reverse current provided from a specific peripheral equipment is prevented from flowing to the interface device or other peripheral equipment.

The user can be aware that a reverse current has been generated because of the manner in which a system is malfunctioning, for example. The user can turn off the two switches SW1 and SW2 manually.

When the interfacing device is stopped because of a communication failure while transmitting and receiving data with the peripheral equipment, the computer system cannot be operated, and the CPU 7 cannot reset the interface device by using the reset signal provided through the reset pin RESET1 in the PCI slots 6. Therefore, the resetting unit 20 must be operated in order to reset the interfacing device. The reset process is explained below.

When the interfacing device is halted, a user presses a push button SW3 of the resetting unit 20. The power Vcc is grounded through the resistor R2, and the signal of low state is provided to the buffer B2, and the buffer outputs the provided signal of low state to the logical AND gate. Because the output signal from the logical AND gate is of low state, the low state reset signal is provided to the reset pin RESET2 of the link layer controller 4 and the link layer controller 4 is reset even if there is no reset signal provided from the reset pin RESET1 of the PCI slots 6, and thereby the interfacing device is reset.

After the interfacing device is reset, the user turns on the two switches SW1 and SW2 in order to supply power to the peripheral equipment. The time to turn on the switches is not extremely critical. The user can turn on the switches soon after the reset operation.

In other words, when a reverse current is supplied from peripheral equipment to the interfacing device through a port, the user turns OFF the two switches SW1 and SW2 to cut off power supplied to the peripheral equipment. As a result, the interfacing device is halted and the CPU 7 of the computer system is also halted. Then the user presses a reset button SW3 of resetting unit 20 in order to reset the interfacing device. Thus, the interfacing device can be conveniently reset without resetting the computer system. Then the user turns ON the two switches SW1 and SW2 to provide power to the peripheral equipment.

In addition, when the interfacing device is normally working, the CPU 7 also can reset the interfacing device through the PCI slots 6.

Therefore, the interfacing device according to the embodiment of the present invention prevents the interfacing device and other peripheral equipment from being damaged by the reverse current generated from a specific peripheral equipment, and resets only the interfacing device, and thereby the computer system does not need to be rebooted in order to reset the interfacing device.

An interfacing device is disclosed which is comprised of a read-only memory (ROM) device, a power regulator, a plurality of specific ports, a link layer controller, a physical layer arbiter, a switching unit which switches the state of the power provided to the peripheral equipment through specific ports, a resetting unit which resets the link layer controller, an indicating unit which displays the state of the power provided to the physical layer arbiter and the operation state of the physical layer arbiter.

The present invention prevents the interfacing device, the computer system, the CPU 7, the PCI slot, and peripheral equipment from being damaged due to a reverse current generated from specific peripheral equipment. And the present invention provides a reset operation conveniently resetting the interfacing device. Thus, the computer system does not need to be restarted in order to reset the interfacing device.

The foregoing paragraphs describe the details of a circuit for stabilizing the interfacing devices, and more specifically, describe a stabilization circuit for preventing the bus interfacing device from being damaged due to the reverse current provided from peripheral equipment, and describe a resetting of the bus interfacing device which is halted by communication failures without affecting the normal operation of the computer system.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An electronic apparatus, comprising:
   at least one external device performing first data processing functions;
   a port unit being coupled to said at least one external device, conveying power to said at least one external device;
   a control unit performing second data processing fimctions;
   an interface unit being coupled to said control unit, said interface unit conveying the power to said port unit from said control unit;
   a reset unit being coupled to said interface unit and said control unit, said reset unit selectively resetting said interface unit; and
   a switch unit being coupled to said port unit and said interface unit, said switch unit switching on to convey power between said interface unit and said port unit, said switch unit switching off to not convey power between said interface unit and said port unit, said interface unit further comprising:
      a link layer controller converting data formats, said link layer controller including a reset terminal resetting said link layer controller;
      a physical layer arbiter selecting first information input from said port unit and conveying said first information to said link layer controller;
      a power regulator providing power to said link layer controller and said physical layer arbiter; and
      an indicating unit indicating a state of the power provided from said power regulator to said physical layer arbiter and indicating an operation state of said physical layer arbiter.

2. The apparatus of claim 1, said port unit further comprising a plurality of ports including a first port, said at least one external device being coupled to said first port.

3. The apparatus of claim 1, said switch unit further comprising:
   a first switch having a first pin coupled to said port unit and a second pin coupled to said interface device; and
   a second switch having a first pin coupled to said port unit and a second pin coupled to a local reference potential.

4. The apparatus of claim 1, said switch unit preventing a reverse current from damaging said interface unit, the reverse current being generated by said at least one external device.

5. The apparatus of claim 1, said switch unit preventing a reverse current from damaging said control unit, the reverse current being generated by said at least one external device.

6. The apparatus of claim 1, said interface unit preventing a reverse current from damaging said control unit, the reverse current being generated by said at least one external device.

7. The apparatus of claim 2,
   said physical layer arbiter holding other information on standby, the other information being input from said port unit and not including said first information.

8. The apparatus of claim 7, said link layer controller receiving first data from said control unit and converting said first data from a first data format to a second data format and outputting to said port unit said first data in said second data format, said link layer controller receiving second data from said port unit and converting said second data from said second data format to said first data format and outputting to said control unit said second data in said first data format.

9. The apparatus of claim 7, said reset unit further comprising:
   a logic AND gate having a first input terminal and a second input terminal and an output terminal, said output terminal of said logic AND gate being coupled to said reset terminal of said link layer controller;
   a first resistor having a first terminal coupled to a voltage supply and having a second terminal coupled to said output terminal of said logic AND gate;
   a first buffer having an output terminal coupled to said first input terminal of said logic AND gate and having an input terminal coupled said control unit;
   a second buffer having an input terminal and an output terminal, said output terminal of said second buffer being coupled to said second input terminal of said logic AND gate;
   a second resistor having a first terminal coupled to the voltage supply and having a second terminal coupled to said input terminal of said second buffer;
   a capacitor having a first terminal coupled to said input terminal of said second buffer and having a second terminal coupled to a local reference potential; and
   a switch device having a first terminal coupled to said input terminal of said second buffer and having a second terminal coupled to the local reference potential.

10. The apparatus of claim 9, said interface unit being reset by a user operating said switch device of said reset unit.

11. The apparatus of claim 9, said control unit further comprising:
   a central processing unit performing said second data processing functions;
   an input/output bus performing input/output functions, said input/output bus having a reset terminal, said input/output bus being coupled to said central processing unit and said reset unit and said interface unit; and
   said control unit resetting said interface unit by outputting a reset signal to said reset unit from said reset terminal of said input/output bus.

12. An electronic apparatus, comprising:
   a port unit having a switch and having a plurality of ports including a first port, said first port being coupled to at least one external device performing first data processing functions, said port unit conveying power to said at least one external device, said port unit switching on to convey power between an interface unit and said at least one external device, said port unit switching off to not convey power between said interface unit and said at least one external device;
   a control unit performing second data processing functions;
   an interface unit conveying the power to said port unit from said control unit;
   a reset unit being coupled to said interface unit and said control unit, said reset unit resetting said interface unit in response to a control signal received from said control unit;

said interface unit further comprising:
- a physical link unit including a reset terminal receiving from said reset unit a reset signal resetting said physical link unit, said physical link unit converting data formats;
- a power regulator providing power to said physical link unit; and
- an indicating unit indicating a state of the power provided from said power regulator to said physical link unit and indicating an operation state of said physical link unit.

13. The apparatus of claim 12, said port unit switching on and off to reset said at least one external device.

14. The apparatus of claim 12, said first port conforming to an Institute of Electrical and Electronics Engineers 1394 standard.

15. The apparatus of claim 12, said control unit further comprising an input/output bus conforming to a Peripheral Component Interconnect standard.

16. The apparatus of claim 12, said at least one external device conforming to a Peripheral Component Interconnect standard.

17. The apparatus of claim 12, said reset unit further comprising:
- a logic AND gate having a first input terminal and a second input terminal and an output terminal, said output terminal of said logic AND gate being coupled to said reset terminal of said physical link unit;
- a first resistor having a first terminal coupled to a voltage supply and having a second terminal coupled to said output terminal of said logic AND gate;
- a first buffer having an output terminal coupled to said first input terminal of said logic AND gate and having an input terminal coupled said control unit;
- a second buffer having an input terminal and an output terminal, said output terminal of said second buffer being coupled to said second input terminal of said logic AND gate;
- a second resistor having a first terminal coupled to the voltage supply and having a second terminal coupled to said input terminal of said second buffer;
- a capacitor having a first terminal coupled to said input terminal of said second buffer and having a second terminal coupled to a local reference potential; and
- a switch device having a first terminal coupled to said input terminal of said second buffer and having a second terminal coupled to the local reference potential.

18. An electronic apparatus, comprising:
- a port unit having a switch and having a plurality of ports including a first port, said first port being coupled to at least one external device performing first data processing functions, said port unit conveying power to said at least one external device, said port unit switching on to convey power between an interface unit and said at least one external device, said port unit switching off to not convey power between said interface unit and said at least one external device;
- a control unit performing second data processing functions;
- an interface unit conveying the power to said port unit from said control unit;
- a reset unit being coupled to said interface unit and said control unit, said reset unit resetting said interface unit in response to a control signal received from said control unit;

said interface unit further comprising:
- a link layer controller including a reset terminal receiving from said reset unit a reset signal resetting said link layer controller, said link layer controller converting data formats;
- a physical layer arbiter selecting first information input from said port unit and conveying said first information to said link layer controller, said physical layer arbiter holding other information on standby, the other information being input from said port unit and not including said first information;
- a power regulator providing power to said link layer controller and said physical layer arbiter; and
- an indicating unit indicating a state of the power provided from said power regulator to said physical layer arbiter and indicating an operation state of said physical layer arbiter.

19. The apparatus of claim 18, said indicating unit further comprising:
- a first indicating component indicating the state of the power provided from said power regulator to said physical layer arbiter; and
- a second indicating component indicating the operation state of said physical layer arbiter.

20. The apparatus of claim 19, said first indicating component further comprising a lighting element having an anode coupled to said power regulator and having a cathode coupled to a local reference potential.

21. The apparatus of claim 19, said physical layer arbiter further comprising:
- a clock terminal outputting a first pulse signal to said indicating unit; and
- a data terminal outputting a second pulse signal to said indicating unit.

22. The apparatus of claim 21, said second indicating component further comprising:
- a first logic NOR gate having a first input terminal and a second input terminal and an output terminal, said first input terminal of said first logic NOR gate being coupled to said clock terminal of said physical layer arbiter, said second input terminal of said first logic NOR gate being coupled to said data terminal of said physical layer arbiter;
- a first resistor having a first terminal and a second terminal, said first terminal of said first resistor being coupled to said output terminal of said first logic NOR gate;
- a capacitor having a first terminal coupled to said second terminal of said first resistor and a having a second terminal coupled to a local reference potential;
- a second logic NOR gate having a first input terminal and a second input terminal and an output terminal, said first and second input terminals of said second logic NOR gate being coupled to said first terminal of said capacitor;
- a lighting element having a cathode coupled to said output terminal of said second logic NOR gate and having an anode; and
- a second resistor having a first terminal coupled to a voltage supply and having a second terminal coupled to said anode of said lighting element.

23. The apparatus of claim 22, said reset unit further comprising:
- a logic AND gate having a first input terminal and a second input terminal and an output terminal, said output terminal of said logic AND gate being coupled to said reset terminal of said link layer controller;

a first resistor having a first terminal coupled to a voltage supply and having a second terminal coupled to said output terminal of said logic AND gate;

a first buffer having an output terminal coupled to said first input terminal of said logic AND gate and having an input terminal coupled said control unit;

a second buffer having an input terminal and an output terminal, said output terminal of said second buffer being coupled to said second input terminal of said logic AND gate;

a second resistor having a first terminal coupled to the voltage supply and having a second terminal coupled to said input terminal of said second buffer;

a capacitor having a first terminal coupled to said input terminal of said second buffer and having a second terminal coupled to a local reference potential; and a switch device having a first terminal coupled to said input terminal of said second buffer and having a second terminal coupled to the local reference potential.

* * * * *